United States Patent [19]

Ito

[11] Patent Number: 4,927,656
[45] Date of Patent: May 22, 1990

[54] METHOD OF PRODUCING EDIBLE VESSEL

[76] Inventor: Sadaharu Ito, 30-5, Saginomiya 1-chome, Nakano-ku, Tokyo 165, Japan

[21] Appl. No.: 188,550

[22] Filed: Apr. 29, 1988

[30] Foreign Application Priority Data

May 1, 1987 [JP] Japan .............................. 62-108579

[51] Int. Cl.$^5$ ........................................ A21D 13/08
[52] U.S. Cl. .................................. 426/549; 426/138; 426/139; 426/391; 426/553; 426/558
[58] Field of Search ............... 426/138, 139, 549, 514, 426/551, 552, 553, 558, 391

[56] References Cited

U.S. PATENT DOCUMENTS

| | | | |
|---|---|---|---|
| 2,694,012 | 11/1954 | Washburn | 426/139 |
| 2,890,958 | 6/1959 | Birnkrant | 426/139 |
| 4,603,051 | 7/1986 | Rubenstein et al. | 426/139 |
| 4,624,855 | 11/1986 | Hass, Sr. et al. | 426/138 |
| 4,629,628 | 12/1986 | Negro | |

Primary Examiner—Donald E. Czaja
Assistant Examiner—Mary S. Mims
Attorney, Agent, or Firm—Cushman, Darby & Cushman

[57] ABSTRACT

A heated food base which is formed by heating a batter which is obtained by kneading wheat flour, an oil or fat, sugar, an edible surfactant such as egg, and water and which is poured onto a heating plate and spread thereon, the heating being performed between heated platens at a certain temperature for a given time in such manner that the starch of the batter is changed to $\alpha$-starch, and the protein therein is coagulated by heat, and a small amount of water remains, so that edible vessels having crispness and good taste, for instance for use as ice cream cones, can be formed by a second baking, at a higher temperature.

7 Claims, 6 Drawing Sheets

METHOD OF PRODUCING EDIBLE VESSEL

BACKGROUND OF THE INVENTION

The present invention relates to a method of producing edible vessels, and particularly to a method of producing edible vessels which is useful for producing edible vessels having the form of a cone such as waffle cones, in which ices such as soft ice cream, ice cream or various other food materials are placed, i.e., waffle cones and square vessels called tarts, each of which is desired to have a small apparent specific gravity, porosity, light weight and a crisp taste.

Edible vessels which are filled with ices such as soft ice cream or ice cream and sold are generally formed in cone shapes by baking a batter obtained by kneading a mixture containing a basic ingredient such as wheat flour and a larger amount of water in a high-temperature heating plate by a manufacturer who specializes in producing such cones. These edible vessels are then packed and delivered to outlets for selling ice cream. However, since one merit of waffle cones are their very crispy taste, waffle cones involve many problems with respect to the difficulty of handling them during baking, as well as after baking and delivery to the sales outlets for ice cream, because waffle cones have very poor resistance to shock and are thus easily damaged.

To remove the aforementioned disadvantages, the present inventor previously has proposed a method of producing edible vessels, disclosed in Japanese patent application No. 26982/1984, in which water is added to a basic ingredient such as wheat flour in such an amount that the flour is formed into a dough and is kneaded, the thus-obtained mixture being spread to a given thickness, and the materials having a required shape then being obtained from the spread dough plate by wrapping or rolling it into cone shapes and hardening to cone shape immediately after baking to obtain edible vessels.

However, in the above-described prior art, the former method has a problem in that, since cone-shaped edible vessels which are hardened immediately after baking are shipped, the cone-shaped edible vessels are easily damaged when shipped, for example, about 20 to 30% of the waffle cones shipped will be no good. In order to avoid this problem, the former method may be employed at the side of a user, i.e., the outlets of a soft ice cream distributer. However, this involves many problems. One is that the level of equipment investment for such items as a baking machine and an apparatus for preparing materials is increased, and there are sometimes limits on the space available for installing such equipment in sales outlets regardless of the difficulty of handling waffle cones and the technique of baking a material which is required, regardless of the amount of the material. It is also difficult to ensure that workers acquire the necessary technique for handling a baking machine and arrange for the supply of the required amperage of electric power when such equipment is installed at sales outlets where ice cream is sold, because they are often temporary employees or part-time workers. Thus, the former method cannot be readily employed in the outlets where ice cream is sold.

On the other hand, the latter method also involves many problems, for example, the fact that waffle cones having a crispy taste cannot be obtained.

The most important reason for the use of wheat flour as a confectionary ingredient is that wheat flour contains protein, unlike rice flour, potato flour and the flour of other grain, most of which consists of starch alone.

Starch is changed to an α-form by water and heat and plays a principal role in forming the shapes of various kinks of confectionary, as well as being an ingredient thereof. With respect to its suitability in the processing of confectionary, wheat flour has processing properties which are mainly determined by the protein contained therein, together with starch as a main component thereof, unlike other types of flour used as basic ingredients of confectionary such as rice flour and potato flour. The properties of wheat flour which are so different from the other types of flour used for confectionary are attributed to its protein component.

Wheat flour greatly differs from other basic ingredients for confectionary in the point that, when wheat flour is kneaded with water, the protein molecules contained therein absorb water, hydrate, and are bonded to each other to form a network structure consisting of sticky and elastic gluten. It could be said that the present invention is based on control of the water and heat used for changing starch to an α-form, as well as control and supervision of the employment of gluten, and clarification of its behavior.

Wheat flour is classified according to the properties and amounts of protein contained in it, i.e., strong flour, medium flour and weak flour. This classification is based on the amounts and properties of gluten produced by the protein, and the use of wheat flour depends upon these amounts and properties.

| Class | Protein content (%) | Gluten | Main use |
| --- | --- | --- | --- |
| Strong flour | 12–14 | Strong | Bread, Chinese noodles |
| Medium flour | 8–11 | Slightly strong | Wheat vermicelli |
| Weak flour | 7–8 | Weak | Confectionary Tempura |

In general, weak flour containing a small amount of protein is used in producing confectionary, and is kneaded with sugar, oil and fat, salt, eggs, milk, spices and coloring agents, together with water, to form a batter or dough which is then subjected to heat processing. In this heat processing, the starch contained in the wheat flour is changed to α-starch, and the protein which forms gluten is subjected to irreversible heat denaturation (heat coagulation) to provide foods in a digestible state with a good taste. General confectionary is basically produced by the above-described method employing wheat flour as the main ingredient.

When wheat flour is kneaded with water, it immediately absorbs water, the amount of water absorbed by the starch being 30% of the weight thereof, and the amount of water absorbed by the protein being 200% of the weight thereof. The water, becomes chemically-bound water which causes the starch to solate and the protein molecules to be bonded together to form sticky and elastic gluten. The starch so produced starts to gel at about 54° C. with the viscosity thereof being increased, and finally becomes α-starch which is edible and digestible. If heating is further continued, the α-starch is dehydrated to become solidified.

On the other hand, gluten forms a three-dimensional spongy network structure, leading to the formation of strong skeletons of the confectionary due to irreversible heat denaturation of the protein during heating.

Although hard confectionaries which are hard to masticate, such as crackers and hard biscuits, are produced in the aforementioned manner, porous foods which are finally supposed to have a crisp taste and to which the present invention relates may be produced by the method described below. A wheat flour ingredient is kneaded with water so that any bubbles produced in the kneaded batter are included in the network structure formed by the gluten due to the presence of egg or the edible surfactant consisting of a synthetic frothing emulsifier contained in the basic material. These bubbles included in the network structure make the gelled α-starch, which is a main component of the processing base material, porous as a result of the soldification which occurs due to the heat denaturation of the gluten upon heating. If heating is continued, the processing base material is dehydrated, and the starch is solidified to form a porous confectionary body. However, with respect to crispness, the body itself becomes hard, as a whole, due to the strong three-dimensional network structure formed by the gluten, even if it is porous.

Therefore, if an oil or fat is kneaded with the material base, the oil or fat is spread in a film form in the material base by the function of the above-described edible surfactant to prevent the binding of the network structure of gluten, whereby the end products can be provided with fragility crispness and a good taste.

Conventional confectionaries such as wafers and waffles which are characterized by crispness, fragility and a good taste can be obtained by heating the basic material until almost all the water therein has been released and further continuing the heating to a temperature above 200° C.

Edible vessels for ice cream are generally formed into thin-skinned cones called waffle cones or dish-like shapes immediately after the products having fragility crispness and a good taste have been obtained by the above-described processing and before the products have cooled. Therefore, such vessels have very weak resistance to impact, and will be damaged during delivery to sales outlets where the vessels are filled with ice cream and sold, because the cones or dish-like forms of vessels are damaged when delivered to users, if each of them is not appropriately packed.

SUMMARY OF THE INVENTION

The present invention is capable of solving the above-described problems and of preventing any damage of edible vessels by allowing a basic material to be baked to form a cone or dish-like shape at a sales outlet. It also has the effect of attracting customers' interest with the pleasant smell generated when the basic material is baked in the sales outlet without any other smells being created. An additional advantage of the present invention is that it allows consumers to recover the sense of taste of their tongue after it has been blunted by eating ice cream and yet also allows them to experience the original taste of the ice cream.

There is provided a method in which wheat flour is kneaded with water containing sugar, oil or fat, and other ingredients, and the obtained mixture is poured onto a heating plate to form waffles which are then filled with ice cream and sold. However, as described above, wheat flour rapidly forms a strong network structure of gluten, if the temperature and agitation conditions are not strictly controlled during the kneading with water, even if weak flour containing a small amount of protein is employed.

Starch is responsible for the formation of the overall shape of the confectionary product, while gluten is responsible for the production of the stickiness of the basic material used to form the confectionary, that is, the so-called batter or dough, as well as hardness of the final confectionary product.

The crispness and good taste depend upon the size, amount and uniformity of distribution of the bubbles contained in the basic material for baking, which greatly depend upon the amount of gluten and the network structure formed thereby. For example, the structure and amount of the gluten formed allow a suitable amount of bubbles of an appropriate size to be uniformly held in the material and also allow the expansion of the bubbles due to heating at the time of the baking of the material to be kept at an appropriate and uniform level.

If there is no gluten, the appropriate amount of bubbles of suitable size will be lost from the confectionary products like the froth on a glass of beer and will not serve to appropriately expand the body of each product.

It is necessary to strictly control such work, particularly the work in which the basic confectionary material containing wheat flour as a main ingredient is produced such that the gluten network is formed, and the process in which the produced material is baked to form a confectionary material which can then be formed into products suitable for sale. It can be said that such work is not easily performed at the kind of sales outlet where ice cream is usually sold by part-time workers. It is thus an object of the present invention to solve this difficulty and to provide a food vessel which can be formed into final products such as waffle cones that can serve as light ice cream vessels, with a crispy texture, at a sales outlet for selling ice cream, without any danger of damage, and which not only allows the final products to generate a pleasant smell when being baked, but which also enables easily-finished products to be prepared in such a manner that they can be served still hot from a heating plate and filled with ice cream such as to give the customers an adequate feeling of satisfaction.

The present invention provides a superior basic material which is formed by mixing water and main ingredients such as wheat flour, oil or fat, eggs and so on, that are stored at a suitable temperature and humidity in an appropriate mixing ratio in a strictly controlled manner, appropriately heating the thus-obtained batter to form α-starch and form an appropriate gluten network that is not too strong and has a suitable arrangement, and heat-hardening the batter while appropriately dispersing bubbles, which would affect the crispness of the products, and controlling the heat volatilization of the bubbles to form first stage products having an appropriate skeleton; the thus-obtained first products containing an appropriate amount of water so that they can retain sufficient softness to prevent any damage during delivery to ice cream sales outlets and during handling at the outlets, whereupon waffle cones which are the same as those produced at factories can be formed by a simple quick process at the outlets, heat energy being effectively utilizable when the first stage products are baked at the outlets. Therefore, if the first stage products are produced by strictly controlling all the processes, they can be easily baked at the outlets to form waffle cones, even by inexperienced, part-time workers, while simultaneously generating a pleasant smell.

In other words, the gist of the present invention is that an appropriate amount of oil or fat is mixed with wheat flour in order to prevent the network structure of gluten from being made strong; an edible surfactant such as egg is mixed with the obtained mixture to help oil or fat films to extend by the frothing emulsification action thereof and also to help small bubbles to be maintained in a confectionary texture so that the final products maintain crispness and a good taste; sugar and salt are mixed with the obtained mixture so as to facilitate these functions; and appropriate flavors are added to the obtained mixture which is then sufficiently and uniformly kneaded with a suitable amount of water to form a batter; the batter then being heated in such a manner that the starch of the wheat flour is changed to $\alpha$-starch and gluten is solidified by heat to form a network structure having an appropriate strength due to the hydration of the protein, and being further heated under conditions which are controlled to ensure that the water remains in an amount (preferably 7 to 20 percent) sufficient to prevent excess energy from being consumed during baking at the sales outlets and to maintain the softness of the batter so that the baked products are not damaged during delivery to the outlets. For example, the temperature may be about 110° to 140° C., which is very much lower than that used in conventional methods of producing confectionary and the time is as short as 30 to 90 seconds. This basic food material heated at a low temperature for a short time can easily be formed into, for example, waffle cones simply by finally baking it at a temperature of 180° to 220° C. for 45 to 60 seconds at the ice cream sales outlets, without any need to consider any factors other than the baking temperature and time. In addition, the basic food material enables light ice cream vessels having crispness and a good taste to be formed by a two-stage method of baking, using wheat flour as a main ingredient.

The process involved, up to the point where the heated basic food material is formed, is critical and a difficult process for producing a basic food material for waffle cones which have a good crisp taste and which are thin and brittle. Inexperienced people such as part-time workers basically lack the ability to perform such a process at the sales outlets for ice cream as such sales outlets have very few facilities and means for controlling the process. However, if the heated basic food material of the present invention is used, waffle cones can easily be formed simply by finally heating the basic material so as to heat-volatize the 4% to 20% water which is retained in the basic material for the purpose of maintaining its softness during delivery.

If the remaining water is volatized by heating, the basic material at a temperature of 170° C. or higher, at which temperature the sugar in the basic material is caramelized and the basic material is thereby given a desirable color, such as light brown. At all events, the present invention enables waffle cones to be easily formed.

Consequently, the present invention enables the heating process to be divided into a heating stage that is conducted at a factory which has the capacity to ensure adequate control, and a final heating stage performed at the sales outlets for ice cream, that is two-stage baking. In this way, foods such as hot waffles which are formed by using wheat flour as a main ingredient and which are brittle and have a good taste can be produced while generating a pleasant smell and yet avoiding any danger of damage.

Rice crackers, one sort of rice cake, have been made in Japan for many centuries and these are also heated in a two-stage process. However, this process is performed to allow drying at a temperature below 100° C. and thus must be called a two-stage drying process. Nonglutinous rice flour as a main ingredient is steamed, kneaded with water and rolled to form a plate-like shape. Portions of this dough for rice crackers are cut off from the plate to produce given shapes and then dried in an oven at 70° to 75° C. until the water content becomes about 20%. This stage is called first drying. The dried portions of dough obtained are allowed to stand at room temperature for a long time to form translucent, glassy dough portions for rice crackers. To form these dough portions into rice cracker products, they are again dried in an oven until the water content becomes about 10 to 15% in a second drying. After the second drying, the dough portions are directly baked by a fire at 200° to 260° C. and flavored with a seasoning such as soy sauce to form rice cracker products.

This method differs from the two-stage method of baking a wheat flour-based material of the present invention, and this two-stage drying method is required for to allow crackers containing bubbles to be formed by using rice flour having no gluten network, rice cake having a viscous structure.

An explanation will now be given of the fundamental difference between rice crackers, sliced and dried rice cake, and a processed food base obtained by baking a wheat flour-based material in a two-stage manner as in the present invention.

Starch of rice flour, which is a main ingredient of rice cake, mainly consists of amylopectin and has thermal expansibility. On the other hand, the starch of wheat flour has no thermal expansibility and thus must be used in combination with egg or a synthetic edible surfactant that can serve as a frothing agent.

A more important difference is that wheat flour contains protein as well as starch, as described above, and the various kinds of confectionary ingredients other than wheat flour have no three-dimensional network structure like that of wheat flour, which depends upon the quality and amount of gluten produced by water absorption and hydration of the protein contained therein. Therefore, for example, rice cakes, and particularly rice crackers, are expanded due to thermal expansion of the amylopectin which is a main component of the starch of rice flour, but when a mixture of rice flour and water is kneaded, rice cake having a high viscosity is formed, because the bubbles which are included therein during the kneading of the mixture are not released. This rice cake is appropriately shaped, then dried in an oven at 70° to 75° C. until the water content becomes about 20% (first drying), and allowed to stand for a long time to form a dough for making rice cakes. Before the dough is baked, it is again dried, as described above, until the water content becomes 10 to 15% (second drying), and then baked by direct fire at 200° to 260° C. and is flavored with a seasoning such as soy source to form a product. This method of producing rice crackers is fundamentally different from the two-stage method of producing a brittle type of confectionary having crispness and a good taste.

It is an object of the present invention to remove the aforementioned disadvantages and various problems and to provide a heated food base which is useful in the production of edible vessels called waffle cones which have a small apparent specific gravity, crispness, and a good taste.

The above-mentioned object of the present invention can be achieved by heating a batter which is obtained by kneading wheat flour, an oil or fat, sugar, an edible surfactant such as egg and water, and which is poured onto a heating plate and spread thereon to form a heated food base, the heating being conducted at relatively low temperature at which the starch in the batter is changed to α-starch, the protein is heat-coagulated, and about 4% to 20% of water remains in the heated product; storing the heated food base while being cooled; again heating the food base to soften it; and shaping it into an edible vessel having a given shape.

DETAILED DESCRIPTION OF PREFERRED EMBODIMENTS

Figure 1A:
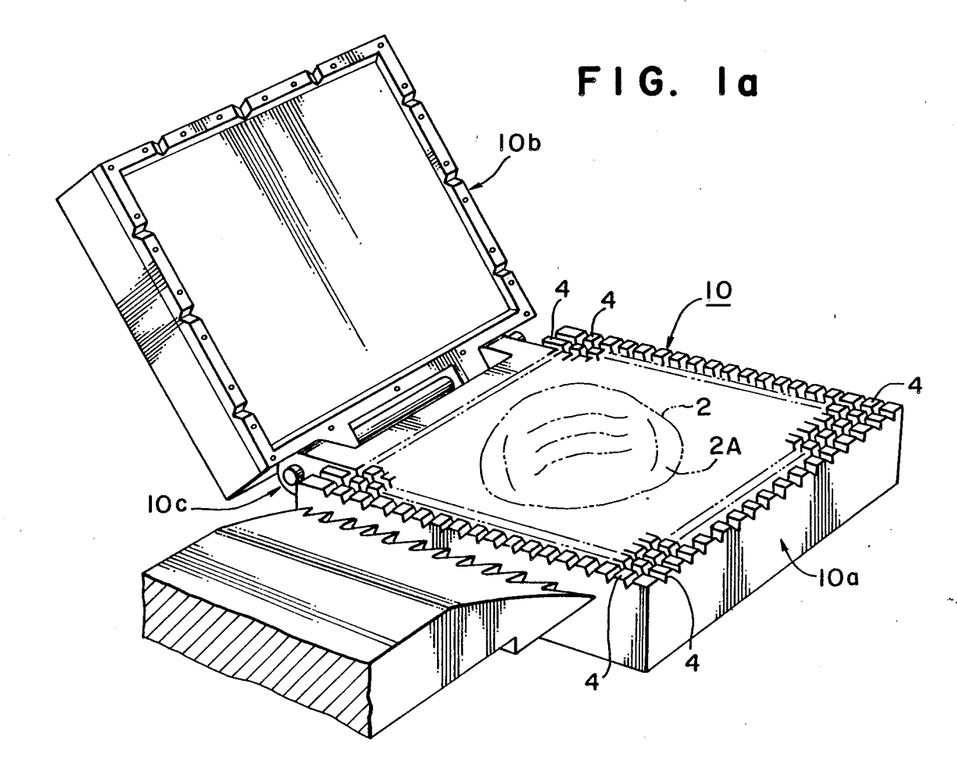
FIG. 1(a) is a perspective view of a baking machine.
Figure 1B:
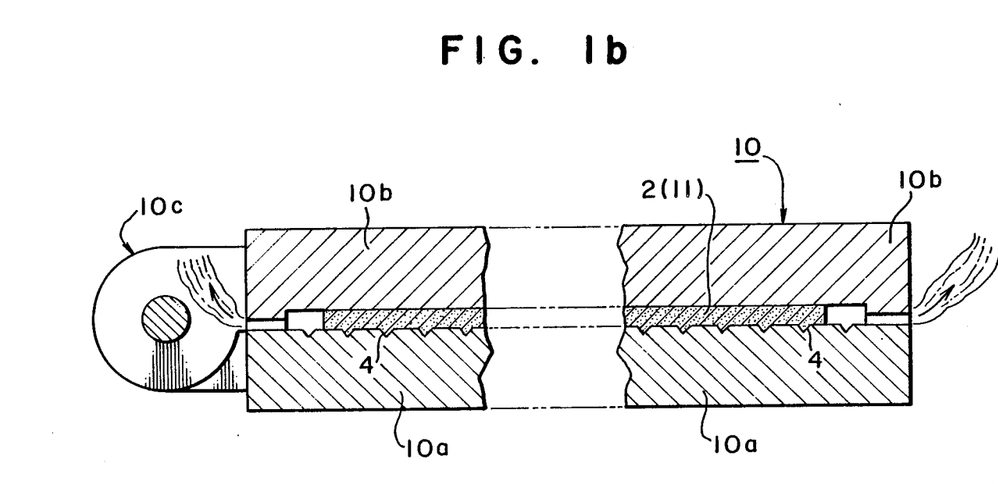
FIG. 1(b) is a sectional view of the baking machine during baking.

In the present invention, and as shown in FIGS. 1(a), 1(b), sugar is mixed with wheat flour to add appropriate sweetness thereto, and an oil or fat, egg serving as an edible surfactant exhibiting the functions with respect to frothing, emulsification and stable maintenance of bubbles or a synthetic compounded edible surfactant exhibiting the same functions are added to the mixture, as well as, if required, baking powder, salt, milk, flavoring and coloring agents. The thus-obtained mixture is poured into a mixer, and water is added to the mixture in an amount capable of making a heated product porous and light, corresponding to the ingredients used. The obtained mixture is kneaded to form a batter 2. A given amount of the batter 2 is placed on a lower plate 10a of two heating plates 10 and formed into a kneaded disc-shaped base 2A which is then heated to obtain a heated food base 11.

The heated food base 11 is stored while being cooled and may be formed into edible vessels such as cones by heating it again (final-stage baking).

For example, the heated food base 11 stored is tightly packed and delivered to users such as outlets for selling ice cream where the food base is taken out of the package, inserted between electric heaters 17, 17 through iron plates 18, 18 in the toaster-like shape of heating case 20 shown in FIGS. 2(a) to 2(d), and heated to a temperature above 170° C. until the surface thereof becomes light brown to obtain a finally baked base 11A which is called a baked product and which is the same as that obtained by a conventional method of continuous baking. This final baked base 11A is immediately sent to the usual vessel forming machine 12 for cones shown in FIG. 3 in which the base 11A is formed into a cone, and then hardened by cooling to obtain the cone-shaped edible vessel 14 shown in FIG. 4.

If the heating plates 10 used for baking the batter are each provided with a checkered pattern 4, the heated food base 11 can be patterned accordingly, whereby an edible vessel 14 having a checkered pattern can be obtained.

Figure 2A:
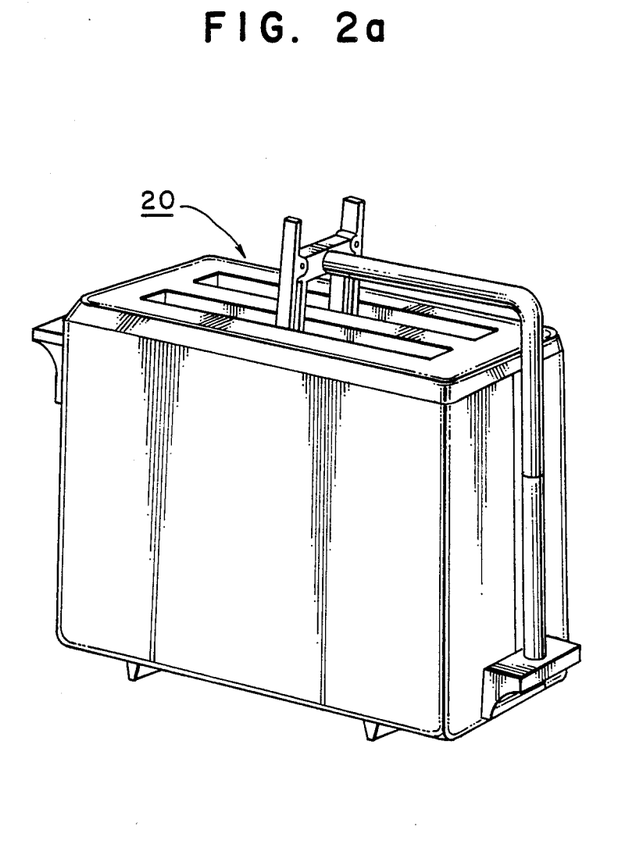
FIG. 2(a) is a perspective view of a final-stage baking machine.
Figure 2B:
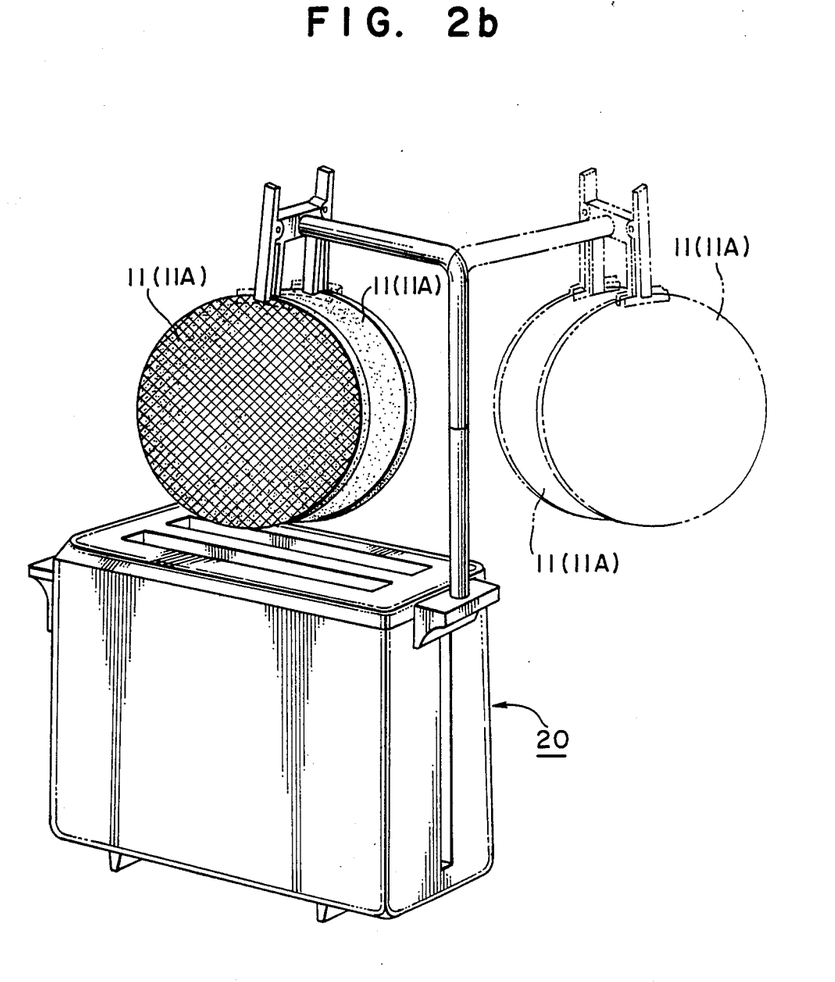
FIG. 2(b) is a perspective view of the final-stage baking machine in a state different from the state shown in FIG. 2(a)
Figure 2C:
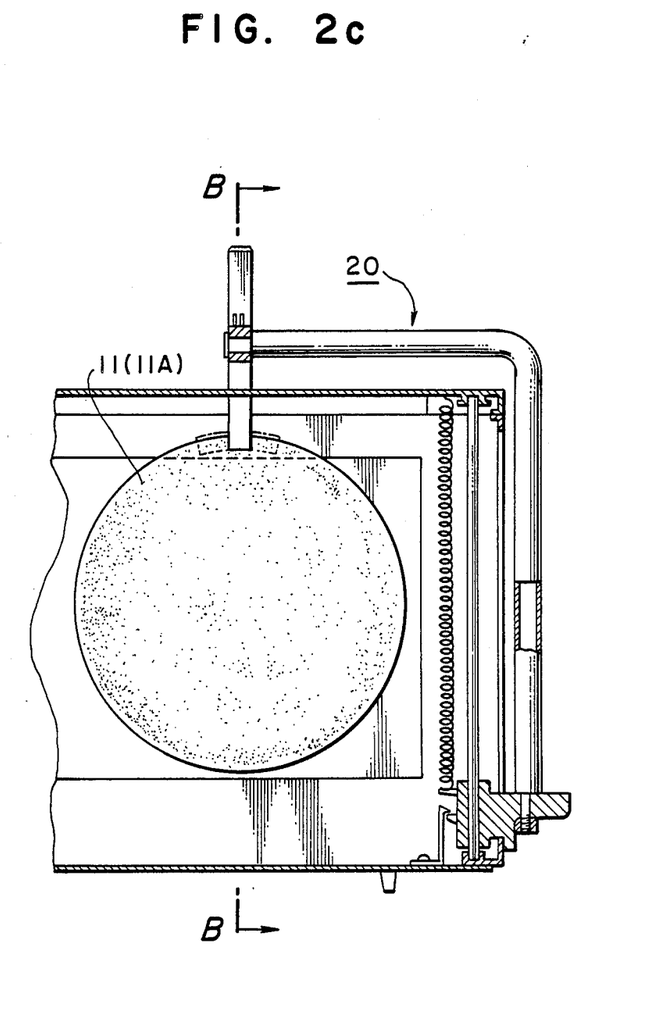
FIG. 2(c) is a sectional view taken along the line A-A in FIG. 2(d)
Figures 2D, 3, 4:
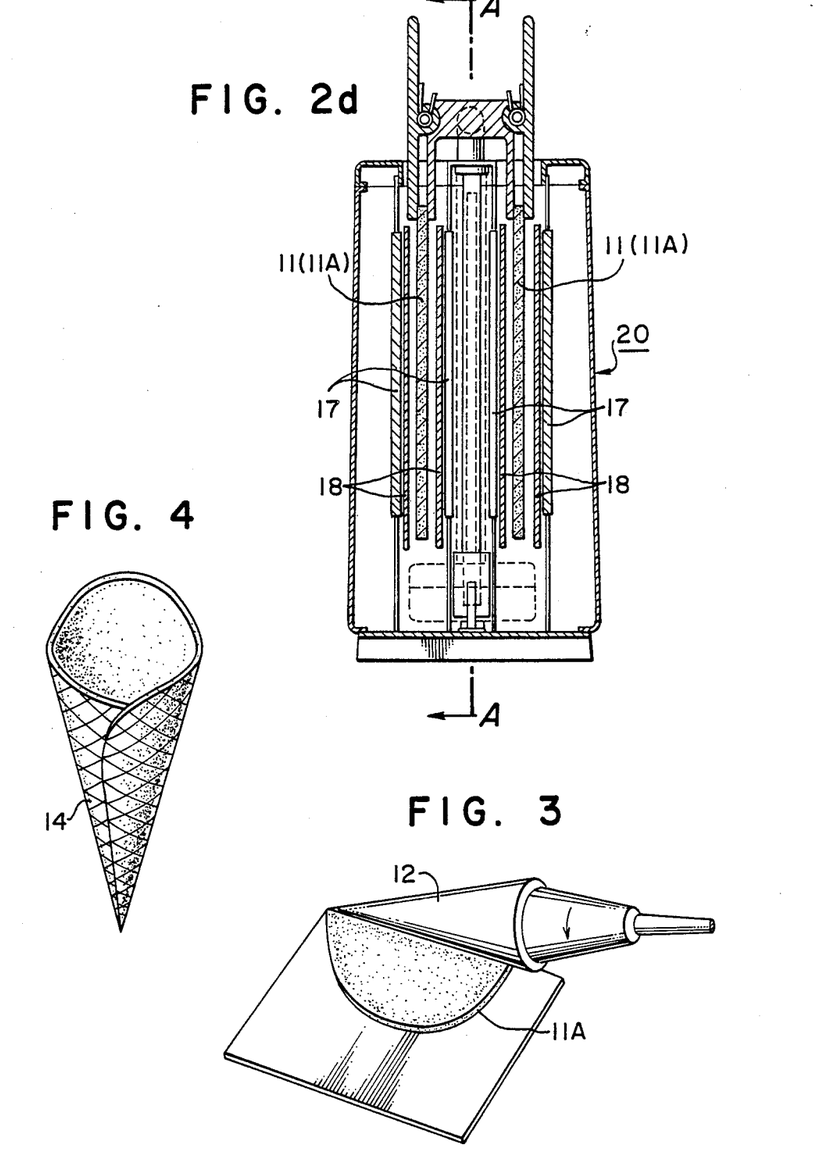
FIG. 2(d) is a sectional view taken along the line B-B in FIG. 2(c)
FIG. 3 is a schematic drawing of an example of a process of producing an edible vessel from a base.
FIG. 4 is a perspective view of an example of the edible vessel obtained by the present invention.

The edible vessel 14 is slightly cooled by the cone forming machine 12 during the shaping and then becomes hardened. Thus, the cone-shaped edible vessel 14 retains its shape and can thus be filled with ice cream and sold at the sales outlet.

Since the heated food base 11 has been previously heated, the starch is changed to α-starch, and the protein is coagulated and skeletonized to some extent. However, the heated food base 11 maintains some flexibility and is not broken when bent, nor it is significantly damaged when subjected to impact. This is because of the presence of oil or fat films that permeate between the starch and the protein and the remaining water which contains an appropriate amount of sugar. Therefore, the heated food base 11 remains substantially undamaged during delivery, which solves the prior art problem with respect to the difficulty of delivery. In addition, since the heating is performed at a temperature at which the α-starch is changed to α-starch and the protein is heat-coagulated, the heating time can be reduced and environmental changes in the vicinity of the location of the first-stage baking can be reduced, because only a small amount of heat is generated. Furthermore, since the final baking is performed by heating the food base until the surface thereof becomes light brown, the baking time at sales outlets for ice cream can also be reduced, and the problem with respect to the generation of heat here can be substantially solved also.

An embodiment of the present invention is described below.

Embodiment 1

| Wheat flour | 80-120 |
|---|---|
| Sugar | 30-60 |
| Oil or fat | 10-30 |
| Egg | 10-30 |
| Monogly glycerin mono-fatty acid ester) | 0.5-2 |
| Powdered milk | 3-5 |
| Salt | 0.5 |
| Coloring and flavoring agents | small amount |
| Water | 80-120 |

(Each numerical value shows the compounding ratio by weight.)

A batter 2 was obtained by well-agitating and mixing the ingredients of Embodiment 1 shown in the accompanying Table. The obtained batter 2 was poured onto the lower heating plate 10a of the two heating plates 10 which were each patterned with a lattice comprising squares having 10-mm sides, the surfaces of which were heated at about 120° to 150° C. An upper heating plate 10b was pressed on the lower heating plate 10a through a hinge 10c, and the batter 2 held between the two heating plates 10a, 10b was baked by heating in such a manner that the batter was kept at about 110° to 140° C. for a given time. Then, the heating plates 10a, 10b were opened to take out a heated food base having a disc shape which was the heated food base 11.

The conditions of pouring of the batter were as follows:

1. The amount of the batter poured at one time: about 25 to 30 g
2. The temperature of the upper and lower heating plates: 120° to 150° C.
3. The thickness of the batter poured was determined by the gap between the two heating plates, the gap being set to a value substantially equivalent to the thickness of the heated food base.

The conditions of heating the batter were as follows:

1. The gap between the heating plates was equivalent to the thickness of the heated food base (the disc-shaped heated base).

In these examples, the gap was 2.5 mm.

2. The heating temperature was 120° C., the temperature of the heating plates was 150° C., and the heating time was 30 to 90 seconds.

Heating temperature: 120° C., 140° C., 150° C.
Heating time:
60 seconds, 75 seconds, 90 seconds (at 120° C.)
60 seconds, 75 seconds (at 140° C.)
45 seconds, 60 seconds (at 150° C.)

3. The features of the heated base (disc-shaped heated base) and the remaining water (measured by a moisture meter produced by Ketto Co.,)

(1) First-stage baking

|  | Feature | Water content |
| --- | --- | --- |
| (111) (110° C., 45 seconds) | White, soft | 19.6% |
| (112) (110° C., 60 seconds) | Slightly-yellowish white soft | 18.2% |
| (121) (110° C., 75 seconds) | Yellowish white soft | 17.6% |
| (122) (120° C., 40 seconds) | Yellow inclining toward white, soft | 16.8% |

In particular, the heated food bases containing large amounts of water (17 to 20%) were soft, and when ten sheets of such bases having a diameter of 160 mm were piled up and a load of 3 g/cm² was applied thereon, these bases adhered to each other. However, they could be easily separated from each other without being damaged. The lattice pattern on each base also was not damaged. Although the heated food bases containing 15 to 17% of water were similarly soft, when ten sheets of such bases were piled up and a load of 5 g/cm² was applied thereon, the bases were not adhered to each other. The heated food bases containing 15 to 19% of water were not broken when they were bent at an angle of about 180°.

In any case, heated food bases with a lattice pattern having a height of about 1.5 mm and 10-mm squares could be obtained. Although these food bases can be eaten as they are because the starch of wheat flour is changed to α-starch, if they are finally baked by heating them in such a manner that the surfaces thereof become light brown, food bases for edible vessels having crispness and a good taste can be obtained.

When all the heated food bases heated under the above-described conditions were finally baked at 220° C. for 60 seconds (second baking), disc-shaped baked products of brownish yellow which contained about 0.3 to 0.4% of remaining water and had crispness and a good taste were obtained.

Since no cracks are produced on the products (bases) of the first baking when they are bent, the food bases can be delivered without any danger of damage.

Although such food bases will be adhered to each other by pressure, the adhesion can be prevented by waxing or interposing films such as polymer films between the bases. Therefore, when a given number (about 10 sheets in one package) of the food bases are put in plastic bags and, if required, the plastic bags are piled up in a corrugated cardboard box, the bases can be transferred without being compressed, if corrugated cardboard is interposed between the respective bags put in layers.

(2) Second-stage baking (final-stage baking)

After the first stage-baked heated food bases had been stored in a dark place at 10° C. for 24 hours, they were finally baked by using the toaster-like form of heater shown in FIGS. 2(a) to 2(d). The heater was provided with heaters 17 made of nichrome wires, and iron plates 18, which were provided on the surfaces of the heaters and which, had a thickness of about 2 mm. The iron plates were heated so as to form heating flat plates with a substantially uniform distribution of temperatures. Two or more heated food bases obtained by heating under the same conditions were suspended one by one between the two heating flat plates at a given temperature for a given time so that the surfaces thereof were heated to form products. The temperature of the surface of each of the heating flat plates was 180° to 190° C., and the gap between the two heating flat plates was about 15 mm. Therefore, the distance between each of the surfaces of the heated food base and the surface of each flat plate was about 5 mm. Consequently, when one of the finally baked discs was formed to a cone shape by using a machine before the sugar ingredient was not hardened due to a decrease in the temperature, a cone product could be obtained. The states of the finally baked disc products which were cooled without being shaped are described below.

| Features and contents of remaining water of finally baked products (disc products) | | | | |
| --- | --- | --- | --- | --- |
| | Heated food base | Condition of final baking | Final feature and taste | Water content |
| (211) | (111) | 180° C., 60 sec. | Yellowish brown, many bubbles, crisp taste | 0.38% |
| (212) | (112) | 180° C., 90 sec. | Brown, slightly harder than (211) | 0.35% |
| (221) | (121) | 180° C., 60 sec. | Light brown, the taste similar to (212) | 0.36% |
| (222) | (122) | 180° C., 90 sec. | Slightly dark brown, the same taste as (212) | 0.31% |

Although any one of the products had crispness and a taste and good state, feelings that the tastes slightly depend upon the differences in the baking conditions were obtained.

The water contents were within the range of 0.3 to 0.4%, and it was found that the conditions of first baking slightly affect the finally baked products.

Embodiment 2

An embodiment using a synthetic surfactant is described below.

| | |
|---|---|
| Wheat flour | 80–120 |
| Sugar | 30–60 |
| Oil or fat | 10–30 |
| Edible surfactant | 2–6 |
| Baking powder | 0.5–1.5 |
| Powdered milk | 3–5 |
| Salt | 0.5–1.0 |
| Other ingredients (coloring and flavouring agents) | small amount |
| Water | 80–120 |

The edible surfactant shown in the table was a compounded substance of a glycerin fatty acid ester and a cane sugar fatty acid ester.

The ingredients shown in the accompanying Table were well-agitated and mixed to form a batter 2. The batter 2 was treated in the same manner as that employed in Embodiment 1 to form heated food bases. These food bases were subjected to the same final baking process as that employed in Embodiment 1. The obtained products had no taste caused by an egg, but had crispness, lightness, taste which were not so different from those obtained in Embodiment 1.

Embodiment 3

Heating conditions:

1. The gap between the heating plates was equivalent to the thickness of a heated food base (disc-shaped heated base).

In each case, the gap was 2.5 mm.

2. The heating temperature was 130° C., the temperature of the heating plates was 160° C., and the heating time was 30 to 90 seconds.

Heating time:
60 seconds, 75 seconds, 90 seconds (120° C.)
60 seconds, 75 seconds (140° C.)
45 seconds, 60 seconds (150° C.)

3. The features of heated food bases (disc-shaped bases) and the contents of the remaining water (measured by a moisture meter produced by Ketto Co.,).

(1) First baking

| | Feature of base | Water content |
|---|---|---|
| (111) (130° C., 75 sec.) | Yellow inclining toward white, soft | 15.2% |
| (112) (130° C., 90 sec.) | Yellowish white | 14.8% |
| (121) (140° C., 60 sec.) | Yellowish white | 11.4% |
| (122) (140° C., 90 sec.) | Yellowish white | 9.8% |

The heated food bases containing 12 to 15% of water were soft and, when ten sheets of such bases were packed in one bag and a load of 5 g/cm$^2$ was applied thereto, they were compressed but did not adhere to each other, and were not broken by bending them at an angle of about 90°.

The heated food bases containing 9 to 12% of water were not compressed and adhered to each other by applying a load of 8 g/cm$^2$, and not broken by bending at an angle of about 60°.

In each, heated food bases with a lattice pattern having a height of 1.5 mm and 10-mm squares were obtained. Although these heated food bases can be eaten as they are because the starch of wheat flour is α-starch, if they are finally baked by further heating until the colors thereof become light brown, bases for edible vessels having crispness and a good taste can be obtained.

All the food bases (111), (112), (121) and (122) which were subjected to the first baking were finally baked at 200° C. for 60 seconds. The final products of the bases (111) and (112) were slightly brownish yellow and contained 0.3 to 0.4% of water. The final products of the food bases (121) and (122) were brownish yellow and contained 0.3 to 0.2% of water.

Since any one of the above-described food bases is soft and no cracks are produced when it is bent at an angle of about 90°, for example, if bags each containing ten sheets of the food bases are put in layers in a corrugated carboard box and stored therein, they can be transferred without being compressed and adhered to each other.

The conditions of the second baking were the same as those used in Embodiment 1, and the results of the final baking were the same as those obtained in Embodiment 1.

Embodiment 4

A batter 2 was formed by well-agitating the ingredients shown in the table in Embodiment 1, and then poured onto the under heating plate 10a shown in FIG. 1(a) which had a lattice pattern having 10-mm squares and the surface of which was previously heated to about 160° to 180° C. The upper heating plate 10b was pressed on the lower heating plate 10a through the hinge 10c, and the batter 2 was baked by heating in such a manner that the temperature of the batter held between the two heating plates 10a, 10b was kept at a temperature of about 130° to 150° C. for a given time. The two heating plates 10a, 10b were then opened so that the baked batter (disc shape) was separated therefrom to form a heated food base 11.

The conditions of pouring of the batter were as follows:

1. The amount of the batter poured at one time: about 25 to 30 g

2. The temperature of the upper and lower heating plates:
160° to 180° C.

3. The thickness of the batter poured was determined by the gap between the two heating plates which was substantially equivalent to the thickness of the heated food base 11.

The conditions of heating were as follows:

1. The gap between the two heating plates was the thickness of the heated food base (disc-shaped base).

In each case, the gap was 2.5 mm.

2. The heating temperature was 140° C., the temperature of the heating plates was 130° C. to 150° C., and the heating time was 40 to 90 seconds.

| Temperature | Time |
|---|---|
| 140° C. | 60 seconds, 75 seconds, 90 seconds |
| 150° C. | 45 seconds, 60 seconds |

3. The features of the heated food bases (disc shape) and the content of remaining water (measured by a moisture meter produced by Ketto Co.,) after first baking.

(1) First baking

|  | Heating conditions | Feature of base | Water content |
|---|---|---|---|
| (111) | 140° C., 90 sec. | Yellow | 9.2% |
| (112) | 140° C., 120 sec. | Yellow | 8.8% |
| (121) | 150° C., 90 sec. | Yellow | 6.8% |
| (122) | 150° C., 120 sec. | Light pink | 4.6% |

The heated bases containing 8 to 10% of water were slightly soft, and when ten sheets of the bases were packed in a bag and a load of 8 g/cm² was applied thereto, they were neither compressed nor adhered to each other. The food bases were not broken by bending them at an angle of about 30°.

The heated bases containing 4 to 7% of water were hard, and when ten sheets of the bases were packed in a bag and a load of 10 g/cm² was applied thereto, they were neither compressed nor adhered to each other. They could be bent at an angle of about 20°, but cracks were produced when they were further bent. If a plastic vessel was used for transferring the bases, the bases would not be broken.

In each case, heated food bases with a lattice pattern which was formed in each surface and had a height of about 1.5 mm and 10-mm squares were obtained. Although these heated food bases can be eaten as they are, because the starch of wheat flour is α-starch, if the heated food bases finally baked by heating until the colors thereof become light brown, edible vessels with crispness and a good taste can be obtained.

When all the heated food bases (111), (112), (121), (122) were subjected to second baking at 200° C. for 60 seconds, the final products of the food bases (111), (112) were slightly yellowish brown and contained 0.1% or less of remaining water, and the final products of the food bases (121), (122) were brown and contained about 0.1% of remaining water. In particular, in the food bases having embossed lattice patterns, the upper surfaces of the lattice patterns were slightly scorched.

When the food bases were finally baked at 180° C. for 60 seconds, the final products were brownish yellow and contained substantially no remaining water.

In the heated food bases containing about 8 to 10% of remaining water, no cracks were produced therein when the bases were bent at an angle of about 30°. The heated food bases containing about 4 to 7% of remaining water could be bent at an angle of about 10°. Therefore, when ten sheets of each type of food base are put in each of the bags and, if required, the bags are stored in piles in a corrugated cardboard box, a corrugated cardboard or a foamed plastic plate which serves as a cushioning medium is interposed between respective bags put in layers so that the heated food bases can be transferred.

In Embodiment 4, the conditions of the second baking are the same those employed in Embodiment 1, and the results obtained by the second baking were the same as those obtained in Embodiment 1.

As described above, in the present invention, when a batter 2 obtained by kneading wheat flour, an oil or fat, sugar, an edible surfactant such as an egg, and water is poured onto the heating plate 10a, spread thereon, and heated, the batter 2 is heated at a relatively low temperature so that the starch contained in the batter 2 is changed to α-starch, the protein is coagulated by heat, and about 4 to 20% of water remains. Therefore, even if a large amount of the water is added to flour as a main ingredient, since the baking is performed at a low temperature of about 110° to 160° C., all of many disadvantages of conventional methods can be removed, for example, the energy required for baking the batter can be reduced. In addition, when heated food bases are delivered, since no cracks are produced in the heated food bases even if they are bent at an angle of about 30°, the bases are neither deformed nor damaged in the course of transport. If the bases are slightly deformed, since the bases can be corrected during second baking (final baking), good edible vessels such as cones and tarts can be obtained regardless of such deformation. Since an outlet for selling ice cream such as soft cream which uses edible vessels is provided only with an extremely simple toaster-like type of small final baking machine of about 200 to 300 W and a cone forming machine, edible vessels can be formed for a short time, and only a small space is required for installing equipment, resulting in a great reduction in the cost of equipment investment. Furthermore, usually-available electrical service will be adequate, and a pleasant smell is generated in sales outlets during the baking of cones, thus attracting customers' interest. Since the operation of baking is simple and can be thus performed by inexperienced workers, such as part-time workers such as are often, of necessity, employed for selling ice cream at outlets, personnel management can be simplified.

What is claimed is:

1. A method for providing a supply of intermediate products which subsequently can be toasted on-site to provide crisp edible vessels, comprising:
   (a) providing a batter mixed from the following ingredients:

| Ingredient | Parts by Weight |
|---|---|
| wheat flour | 80–120 |
| sugar | 30–60 |
| oil or fat | 10–30 |
| egg | 10–30 |
| glycerin mono-fatty acid ester | 0.5–2 |
| powdered milk | 3–5 |
| salt | 0.5 |
| coloring and flavoring agents | small amount |
| water | 80–120 |

(b) inserting quanta of the batter between upper and lower platens heated to 120°–180° C. so that each quantum is contacted on opposite faces by respective upper and lower platens;
   (c) while maintaining the batter at 110°–150° C. by heat transfer thereto from the platens partially baking the quanta of batter to produce disk-like intermediate products having a moisture content in the range of more than 7 percent to 20 percent by weight; and
   (d) cooling, stacking and packaging into packages of at least ten, said intermediate products.
2. The method of claim 1, wherein:
   each said quantum of batter weighs 25 to 30 grams.
3. The method of claim 2, wherein:
   while performing step (c), said upper and lower heated platens are arranged about 2.5 mm apart.
4. The method of claim 3, wherein:
   step (c) is carried out for from 30 to 90 seconds.
5. The method of claim 1, wherein:
   one of said heated platens had a waffle-patterned surface thereof in contact with said quanta while performing step (c).

6. A method for providing a crisp edible vessel at a food vending stand, comprising:

performing the following steps (a)–(d) at a first food manufacturing site:

(a) providing a batter mixed from the following ingredients:

| Ingredient | Parts by Weight |
|---|---|
| wheat flour | 80–120 |
| sugar | 30–60 |
| oil or fat | 10–30 |
| egg | 10–30 |
| glycerin mono-fatty acid ester | 0.5–2 |
| powdered milk | 3–5 |
| salt | 0.5 |
| coloring and flavoring agents | small amount |
| water | 80–120 |

(b) inserting quanta of the batter between upper and lower platens heated to 120°–180° C. so that each quantum is contacted on opposite faces by respective upper and lower platens;

(c) while maintaining the batter at 110°–150° C. by heat transfer thereto from the platens partially baking the quanta of batter to produce disk-like intermediate products having a moisture content in the range of more than 7 percent to 20 percent by weight; and (d) cooling, stacking and packaging into packages of at least ten, said intermediate products;

thereafter:

(e) shipping at least one said package to a food vending stand located at a second site which is geographically separated from said first site;

(f) at said second site, withdrawing a said intermediate product from the respective package; and (g) toasting said intermediate product between platens heated to from more than 170° C. up to 220° C. for at least 60 seconds and sufficiently to transform said intermediate product into a browned product having a moisture content of 0.4 percent or less, be weight; and (h) while said browned product remains warm, and therefore pliable due to toasting in step (g), shaping said browned product into a vessel shape, and maintaining such shape as the browned product cools, thereby becoming brittle and crisp.

7. A method for providing a cone of ice cream, comprising:

performing the following steps (a)–(d) at a first food manufacturing site: (a) providing a batter mixed from the following ingredients:

| Ingredient | Parts by Weight |
|---|---|
| wheat flour | 80–120 |
| sugar | 30–60 |
| oil or fat | 10–30 |
| egg | 10–30 |
| glycerin mono-fatty acid ester | 0.5–2 |
| powdered milk | 3–5 |
| salt | 0.5 |
| coloring and flavoring agents | small amount |
| water | 80–120 |

(b) inserting quanta of the batter between upper and lower platens heated to 120°–180° C. so that each quantum is contacted on opposite faces by respective upper and lower platens;

(c) while maintaining the batter at 110°–150° C. by heat transfer thereto from the platens partially baking the quanta of batter to produce disk-like intermediate products having a moisture content in the range of more than 7 percent to 20 percent by weight; and (d) cooling, stacking and packaging into packages of at least ten, said intermediate products;

thereafter:

(e) shipping at least one said package to a food vending stand located at a second site which is geographically separated from said first site;

(f) at said second site, withdrawing a said intermediate product from the respective package; and (g) toasting said intermediate product between platens heated to from more than 170° C. up to 220° C. for at least 60 seconds and sufficiently to transform said intermediate product into a browned product having a moisture content of 0.4 percent or less, be weight; and (h) while said browned product remains warm, and therefore pliable due to toasting in step (g), shaping said browned product into a vessel shape, and maintaining such shape as the browned product cools, thereby becoming brittle and crisp, the vessel shape being an open-topped cone; and (i) piling a quantum of ice cream into said open-topped cone and serving the resulting ice cream cone to a customer from said food vending stand.

* * * * *